(12) United States Patent
Tsang

(10) Patent No.: US 9,305,398 B2
(45) Date of Patent: Apr. 5, 2016

(54) METHODS FOR CREATING AND DISPLAYING TWO AND THREE DIMENSIONAL IMAGES ON A DIGITAL CANVAS

(75) Inventor: Wai-Ming Peter Tsang, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 659 days.

(21) Appl. No.: 12/900,753

(22) Filed: Oct. 8, 2010

(65) Prior Publication Data

US 2012/0086705 A1  Apr. 12, 2012

(51) Int. Cl.
*G09G 5/00* (2006.01)
*G06T 19/00* (2011.01)

(52) U.S. Cl.
CPC ...................... *G06T 19/00* (2013.01)

(58) Field of Classification Search
USPC ......................................... 345/441
See application file for complete search history.

(56) References Cited

U.S. PATENT DOCUMENTS

| | | | | |
|---|---|---|---|---|
| 4,925,294 A | * | 5/1990 | Geshwind et al. | 352/57 |
| 5,182,548 A | * | 1/1993 | Haeberli | 345/639 |
| 5,315,377 A | | 5/1994 | Isono et al. | |
| 5,592,597 A | * | 1/1997 | Kiss | 345/419 |
| 5,611,036 A | * | 3/1997 | Berend et al. | 345/441 |
| 5,835,086 A | | 11/1998 | Bradstreet et al. | |
| 5,940,081 A | * | 8/1999 | Guo et al. | 345/442 |
| 5,999,190 A | * | 12/1999 | Sheasby et al. | 345/589 |
| 6,011,536 A | * | 1/2000 | Hertzmann et al. | 345/418 |
| 6,067,094 A | * | 5/2000 | Schuster | 345/441 |
| 6,226,000 B1 | * | 5/2001 | Richens et al. | 345/419 |
| 6,304,677 B1 | * | 10/2001 | Schuster | 382/264 |
| 6,329,990 B1 | * | 12/2001 | Silverbrook et al. | 345/589 |
| 6,496,598 B1 | * | 12/2002 | Harman | 382/154 |
| 6,590,573 B1 | * | 7/2003 | Geshwind | 345/419 |
| 6,628,295 B2 | * | 9/2003 | Wilensky | 345/594 |

(Continued)

FOREIGN PATENT DOCUMENTS

WO          02/27667 A1      4/2002

OTHER PUBLICATIONS

Vandoren et al. "FluidPaint: An Interactive Digital Painting System Using Real Wet Brushes". Proceedings of the ACM International Conference on Interactive Tabletops and Surfaces, Banff, Canada, Nov. 23-25, 2009.

(Continued)

*Primary Examiner* — M Good Johnson
(74) *Attorney, Agent, or Firm* — Heslin Rothenberg Farley & Mesiti P.C.

(57) ABSTRACT

A trajectory is drawn on a digital canvas with a pointing device, wherein the trajectory comprises a plurality of spaced points, and each spaced point has a plurality of characteristics, including a geometric profile, a depth, and a color if a color trajectory or an intensity if a monochromatic trajectory. One or more of the plurality of characteristics is adjusted by manually controlling a speed of the drawing, and a faster drawing speed results in spacing between two successive points that is greater than that resulting from a slower speed. A line is generated by interpolating the space between the points. A picture is created with a number of trajectories and/or lines. A three-dimensional image may be created from the picture by creating, then integrating a set of multi-view images from the picture. The picture in progress and/or as completed may be displayed, for example, on a three-dimensional display.

48 Claims, 7 Drawing Sheets

(56) References Cited

U.S. PATENT DOCUMENTS

| | | | |
|---|---|---|---|
| 6,870,550 B1* | 3/2005 | Schuster et al. | 345/639 |
| 7,102,633 B2* | 9/2006 | Kaye et al. | 345/419 |
| 7,551,770 B2 | 6/2009 | Harman | |
| 7,573,489 B2 | 8/2009 | Davidson et al. | |
| 7,697,002 B2* | 4/2010 | McCall et al. | 345/467 |
| 7,764,827 B2* | 7/2010 | Op De Beeck et al. | 382/154 |
| 7,817,159 B2* | 10/2010 | Schuster et al. | 345/582 |
| 7,884,834 B2* | 2/2011 | Mouilleseaux et al. | 345/619 |
| 7,995,071 B2* | 8/2011 | Guinan et al. | 345/581 |
| 8,018,470 B2* | 9/2011 | Hsu | 345/619 |
| 8,081,187 B2* | 12/2011 | Perani et al. | 345/441 |
| 8,279,221 B2* | 10/2012 | Song et al. | 345/427 |
| 8,599,243 B2* | 12/2013 | Okada et al. | 348/46 |
| 2005/0001854 A1* | 1/2005 | Schuster et al. | 345/639 |
| 2006/0192776 A1 | 8/2006 | Nomura et al. | |
| 2007/0024614 A1* | 2/2007 | Tam et al. | 345/419 |
| 2008/0024598 A1 | 1/2008 | Perlin et al. | |
| 2008/0303894 A1 | 12/2008 | Ernst et al. | |
| 2009/0157366 A1* | 6/2009 | Shin et al. | 703/9 |
| 2010/0103249 A1* | 4/2010 | Lipton et al. | 348/51 |
| 2010/0141757 A1 | 6/2010 | Baik et al. | |
| 2010/0269065 A1* | 10/2010 | Uchimura | 715/810 |
| 2011/0285910 A1 | 11/2011 | Bamji et al. | |
| 2012/0008672 A1* | 1/2012 | Gaddy et al. | 375/240.01 |
| 2012/0235988 A1* | 9/2012 | Karafin et al. | 345/419 |

OTHER PUBLICATIONS

Chu et al. "Real-time Painting with an Expressive Virtual Chinese Brush". IEEE Computer Graphics and Applications, vol. 24, No. 5, 76-85 (2004).

Vandoren et al. "IntuPaint: Bridging the Gap Between Physical and Digital Painting". IEEE International Workshop on Horizontal Interactive Human Computer System, 71-78 (2008).

International Search Report for International Application No. PCT/IB2010/053373, dated Apr. 12, 2011.

* cited by examiner

METHODS FOR CREATING AND DISPLAYING TWO AND THREE DIMENSIONAL IMAGES ON A DIGITAL CANVAS

BACKGROUND OF THE INVENTION

1. Technical Field

The present invention generally relates to creating digital pictures. More particularly, the present invention relates to creating three-dimensional pictures and/or pictures exhibiting a hand drawn appearance using two-dimensional input.

2. Background Information

Digital picture creation often requires complex software and intensive training Even with these things, the resulting pictures are such that a viewer of the picture can usually tell that the picture was created on a computer, partially because pictures created on a computer often lack the ability to freely modulate properties, for example the thickness and/or brightness of a line, as they are being drawn. The lack of this ability prevents users from capturing imperfections or style options that are possible, and perhaps even desired, with hand drawn pictures. Some computer software, such as Adobe Photoshop, may allow the user to manipulate certain properties of particular aspects of a picture, such as the color of a line or area, but this often requires using multiple drawing and filtering tools to accomplish such an adjustment.

Additionally, if a user wishes to convert a two-dimensional picture into a three-dimensional display, the procedure is often complex and labor-intensive. A typical procedure is for a user to have to generate multiple foreground and background layers, and shift each of them with different displacement, before finally merging them into an integrated three-dimensional image through a rendering software program. Existing software packages such as 3DMAX and MAYA require users to draft three-dimensional models and then apply drawing and editing tools to modify the shape and color or intensity variations of the objects.

Further, with the emergence and growing popularity of three-dimensional monitor technology, the need to easily create three-dimensional pictures is expected to increase.

Thus, a need exists for an easier way to create digital pictures that exhibit a hand drawn appearance, as well as more easily creating three dimensional images from two dimensional pictures.

SUMMARY OF THE INVENTION

Briefly, the present invention satisfies the need for a method of creating digital pictures with a hand drawn appearance by allowing a user to control one or more characteristics of each point or line drawn simply by varying the speed at which it is drawn. The present invention also provides a method of more easily converting a two-dimensional picture into a three-dimensional image.

The present invention provides, in a first aspect, a method of creating a three-dimensional image from a two-dimensional picture. The method comprises generating a plurality of lines from a plurality of spaced points for each line, each point comprising image data, by interpolating the space between adjacent points of a given line, the plurality of lines together creating a two-dimensional picture. The method further comprises creating a set of multi-view images, each multi-view image comprising a left-eye image and a right-eye image, both the left-eye image and right-eye image created from the two-dimensional picture, each multi-view image being created by applying an offset factor to each point in the two-dimensional picture, and integrating the set of multi-view images to create a three-dimensional image capable of being displayed on a three-dimensional autostereoscopic display.

The present invention provides, in a second aspect, a system for implementing a method of creating a three-dimensional image from a two-dimensional picture. The system comprises a central processing unit, a memory in communication with the central processing unit, and a pointing device in communication with the central processing unit for implementing the method. The method comprises generating a plurality of lines from a plurality of spaced points for each line, each point comprising image data, by interpolating the space between adjacent points of a given line, the plurality of lines together creating a two-dimensional picture. The method further comprises creating a set of multi-view images, each multi-view image comprising a left-eye image and a right-eye image, both the left-eye image and right-eye image created from the two-dimensional picture, each multi-view image being created by applying an offset factor to each point in the two-dimensional picture, and integrating the set of multi-view images to create a three-dimensional image capable of being displayed on a three-dimensional autostereoscopic display.

The present invention provides, in a third aspect, a computer program product for creating a three-dimensional image from a two-dimensional picture. The computer program product includes a storage medium readable by a processing circuit and storing instructions for execution by the processing circuit for performing the method. The method comprises generating a plurality of lines from a plurality of spaced points for each line, each point comprising image data, by interpolating the space between adjacent points of a given line, the plurality of lines together creating a two-dimensional picture. The method further comprises creating a set of multi-view images, each multi-view image comprising a left-eye image and a right-eye image, both the left-eye image and right-eye image created from the two-dimensional picture, each multi-view image being created by applying an offset factor to each point in the two-dimensional picture, and integrating the set of multi-view images to create a three-dimensional image capable of being displayed on a three-dimensional autostereoscopic display.

The present invention provides, in a fourth aspect, a computer program product for generating a drawing on a digital canvas, the computer program product including a storage medium readable by a processing circuit and storing instructions for execution by the processing circuit for performing a method of drawing on a digital canvas, the method including the steps of drawing a trajectory on a digital canvas with a pointing device, wherein the trajectory comprises a plurality of spaced points, and wherein each spaced point comprises a plurality of characteristics, including a geometric profile, a depth, and a color if a color trajectory or an intensity if a monochromatic trajectory, and adjusting at least one of the plurality of characteristics for at least one of said points by manually controlling a speed of the drawing, wherein a faster drawing speed results in spacing between two successive points of the plurality of spaced points that is greater than that resulting from a slower speed.

These, and other objects, features and advantages of this invention will become apparent from the following detailed description of the various aspects of the invention taken in conjunction with the accompanying drawings.

DETAILED DESCRIPTION OF THE INVENTION

Figure 1:
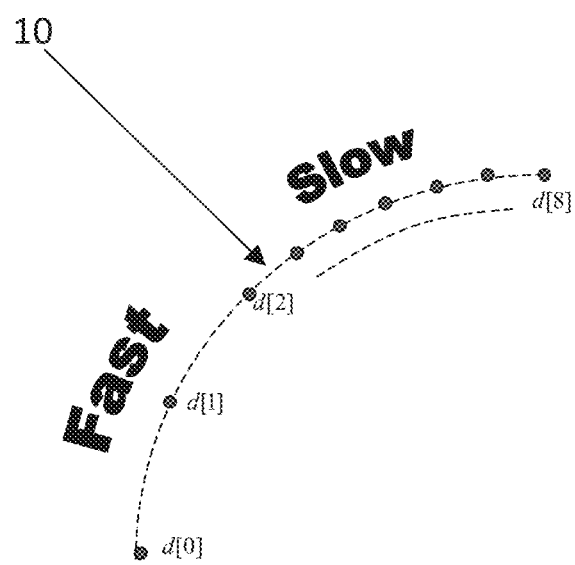
FIG. 1 is a drawing of a trajectory made according to one method of the present invention.

The present invention includes, in one aspect, a method of drawing on a digital canvas. The method includes drawing a trajectory on a digital canvas with a pointing device, the trajectory comprising a plurality of spaced points. Each spaced point comprises a plurality of characteristics, including a geometric profile, a depth, and a color if a color trajectory or an intensity if a monochromatic trajectory. The method also includes adjusting at least one of the plurality of characteristics for at least one of said points by manually controlling a speed of the drawing. A faster drawing speed results in spacing between two successive points of the plurality of spaced points that is greater than that resulting from a slower speed. The drawing and adjusting are repeated to produce a plurality of lines that comprise a picture. The picture may then be rendered and displayed, for example, on a three-dimensional display.

For the purposes of this disclosure, the term "trajectory" means a path traced from a start point to an end point of a line, for example, a curve. It is represented by the variable D of uniformly or non-uniformly spaced sample points on the line. Let $S=[s(0), s(1), \ldots, s(M-1)]$ denote a discrete line with M points, each indexed by the parameter m. Each point $s(m)$ on the curve is represented by its horizontal position, $x(m)$, and its vertical position, $y(m)$, on the digital canvas. The trajectory $D=[d(0), d(1), \ldots, d(N-1)]$ is a sequence of length N (where $N \leq M$) with each entry a sample point on the curve S. Each point $d(n)$ on the trajectory is represented by its horizontal position $x(n)$, and its vertical position $y(n)$ on the digital canvas. The first and the last entries in D are the start and end points of the curve, respectively. i.e., $d(0)=s(0)$ and $d(N-1)=s(M-1)$. In another words, D may correspond either to a subset of sample points in S, or to the full set of sample points in S.

The term "geometric profile" is defined herein as the variation in thickness of a line and is denoted by the variable T. The thickness of each point on a trajectory D is represented by the sequence $T=[t(0), t(1), \ldots, t(N-1)]$.

The term "color profile" is defined herein as the variation of color of a line if the line is in color, or variation of intensity of a line if the line is monochromatic, and in either case the color profile is denoted by the variable C. The color or intensity of each point on a trajectory D is represented by the sequence $C=[c(0), c(1), \ldots, c(N-1)]$. Each entry in C is an ordered triplet representing the red, green, and blue components of a color, for example $c(n)_{0 \leq m < N} = (r(n), g(n), b(n))$.

The term "depth profile" is defined herein as the variation of the depth of a line on a digital canvas and is denoted by the variable Z. The depth of each point on a trajectory D is represented by the sequence $Z=[z(0), z(1), \ldots, z(N-1)]$.

In one aspect of the invention, a user draws a trajectory using a pointing device. Any pointing device capable of being used to draw a trajectory on a digital canvas is intended to be considered within the scope of the invention including, but not limited to, a mouse, a joystick, a light pen, ultrasonic sensors and a digital camera detecting certain light emitting devices (for example, a light emitting diode).

Regardless of the specific pointing device used, a user may draw a trajectory in at least two ways. First, a user may move the pointing device through space, with each specific point on the trajectory being automatically selected. If a user employs this method, the points on the trajectory are chosen based upon the speed at which the trajectory, or a portion of the trajectory, is drawn. The spacing $\Delta(d[i], d[i+1])$ between a pair of consecutive points $d[i]$ and $d[i+1]$ on the trajectory can be expressed as $$\Delta(d[i], d[i+1]) = R \times v_{i,i+1}$$

where R is a predetermined value that can be modified by the user. For example, R may be assigned a value of 0.1 second. The term $v_{i,i+1}$ is the average velocity of the pointing device as it is moved by the user from point $d[i]$ to $d[i+1]$ on the trajectory. As such, it is understood that the pointing device is moving at a normal drawing speed and $v_{i,i+1}$ must be bigger than zero. If $v_{i,i-1}$ is smaller than a certain threshold value which can be predetermined by the user, the spacing will be set to a minimum limiting value. For example, FIG. 1 shows an aspect of the invention wherein a user begins drawing a trajectory (10) at a particular speed ("fast" in this example) and then decelerates and draws the remaining portion of the trajectory (10) at a slower speed. As can be seen in FIG. 1, the points (d[0]–d[8]) automatically selected are spaced further apart when the user draws a trajectory (10), or portion thereof, at a particular speed, relative to when the user draws a trajectory (10), or portion thereof, at a slower speed. The rate at which points are automatically selected could of course be adjusted according to the needs of the application.

Second, a user may manually assign the points that will comprise a trajectory. In this case, the user will specifically choose the spacing between the points as well as the number of points in a particular trajectory. These two examples are meant to be illustrative of how a user may draw a trajectory, and are not meant to be limiting.

The method used to draw a trajectory notwithstanding, each spaced point on the trajectory comprises a plurality of characteristics, including a geometric profile, a color or intensity profile, and a depth profile. A particular spaced point will have a color profile if the trajectory is in color and it will have an intensity profile if it is monochromatic. Each of the plurality of characteristics may be assigned automatically, may be assigned manually, or a mixture thereof, before or after the trajectory is drawn by a user.

The geometric profile of each spaced point on a trajectory begins with the first point on a trajectory having a defined thickness value, set by the user, $t(0)$. Other points on the trajectory are assigned a value according to the formula $t(n) = t(n-1) + \Delta T \times sgn(n)$, where $\Delta T$ is a constant and $sgn(n)$ is either +1 or −1. All the quantities can be specified by the user, or assigned as a pre-defined quantity. As an example, if a trajectory consisted of four points $[d(0), d(1), d(2), d(3)]$ with the thickness of the starting point $d(0)$ equal to 1, $\Delta T=2$, and $sgn(n)=+1 \; \forall \; n$, the thickness profile will be [1, 3, 5, 7].

The color or intensity profile of each spaced point in a trajectory begins with a first spaced point having a defined color or intensity value, set by the user, $c(0)$. Other points on the trajectory are assigned a value according to the formula $c(n)=c(n-1)+\Delta C \times sgn(n)$, where $\Delta C$ is an ordered triplet $(\Delta C_R, \Delta C_G, \Delta C_B)$, $\Delta C_R$, $\Delta C_G$, and $\Delta C_B$ are constant values, and $sgn(n)$ is either +1 or −1. All the quantities can be specified by the user, or assigned as a pre-defined quantity. As an example, if a trajectory consisted of four points [d(0), d(1), d(2), d(3)] with the color of the starting point c(0) equal to (255, 0, 0) (i.e. red, under an RGB color system), $\Delta C=(-16, 0, 0)$, and $sgn(n)=-1 \; \forall \; n$, the color profile would be [(255, 0, 0), (239, 0, 0), (223, 0, 0), (207, 0, 0)]. If a line is monochromatic, all the three primary color components will be identical. For example, white is represented by the ordered triplet (255, 255, 255).

The depth profile of each spaced point may be calculated in multiple ways. A first non-limiting example is where the depth profile is derived from the color profile as $z(n)=[W_R C_R(n)+W_G C_G(n)+W_B C_B(n)]$, where $W_R$, $W_G$ and $W_B$ are weigh and each is a finite real number (positive or negative) which can be individually adjusted by the user, and a higher weighting implies that the color associated with it will have a stronger effect over the depth perception of the line. In this example, $W_R$ is the weighting factor for the red color component of a point, $W_G$ is the weighting factor for the green component of a point, and $W_B$ is the weighting factor for the blue component of a point.

As a second non-limiting example, the depth profile may be calculated in a manner similar to the geometric profile in that a trajectory begins with a first spaced point having a defined color or intensity value, set by the user, z(0). Other points in the trajectory are assigned values according to the formula $z(n)=z(n-1)+\Delta Z \times sgn(n)$, where $\Delta Z$ is a constant and $sgn(n)$ is either +1 or −1. All the quantities can be specified by the user, or assigned as a pre-defined quantity. As an example, if a trajectory consisted of four points [d(0), d(1), d(2), d(3)] with the depth of the starting point d(0) equal to 1, $\Delta T=2$, and $sgn(n)=+1 \; \forall \; n$, the depth profile will be [1, 3, 5, 7].

Another aspect of the invention includes the method described above with the additional step of interpolating between adjacent points on a trajectory to generate a line, for example, a curve. In accordance with this, the space between adjacent points that is generated via interpolation may have a value for each of the plurality of characteristics that the spaced points on the trajectory have. With regard to geometric profile, the part of the line that is generated by interpolating a pair of adjacent points d(n−1) and d(n) may be assigned a thickness of t(n−1). With regard to color or intensity profile, the part of the line that is generated by interpolating a pair of adjacent points d(n−1) and d(n) may be assigned a color or intensity of c(n−1). With regard to depth profile, the part of the line that is generated by interpolating a pair of adjacent points d(n−1) and d(n) may be assigned a depth of z(n−1). Several methods of interpolation are within the scope of the invention including, for example, connecting adjacent points with a straight line.

Figure 2:
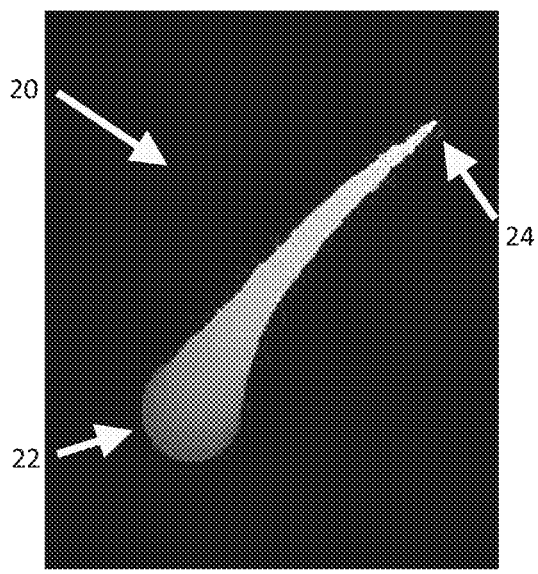
FIG. 2 depicts an example trajectory drawn according to an aspect of the present invention.

In addition to the spacing between adjacent points, one or more of the plurality of characteristics may be adjusted by manually controlling the speed at which a trajectory or portion of a trajectory is drawn. FIG. 2 shows an example trajectory (20) with a first end (22) and a second end (24) created according to the method of the present invention where the geometric profile (thickness) and color profile are each adjusted by the speed at which the user draws the trajectory (20). In FIG. 2, the thickness of the trajectory (20) decreases more rapidly, and the intensity of increases more rapidly, when the speed of drawing is slow. FIG. 2 shows that the first end (22) of the trajectory, the portion which was drawn most slowly, has a larger rate of reduction in the thickness and a higher rate of increment on the intensity. The second end (24), which was drawn at a faster speed, has the smallest rate of decrement of thickness and a lower change in the intensity.

Figure 3:
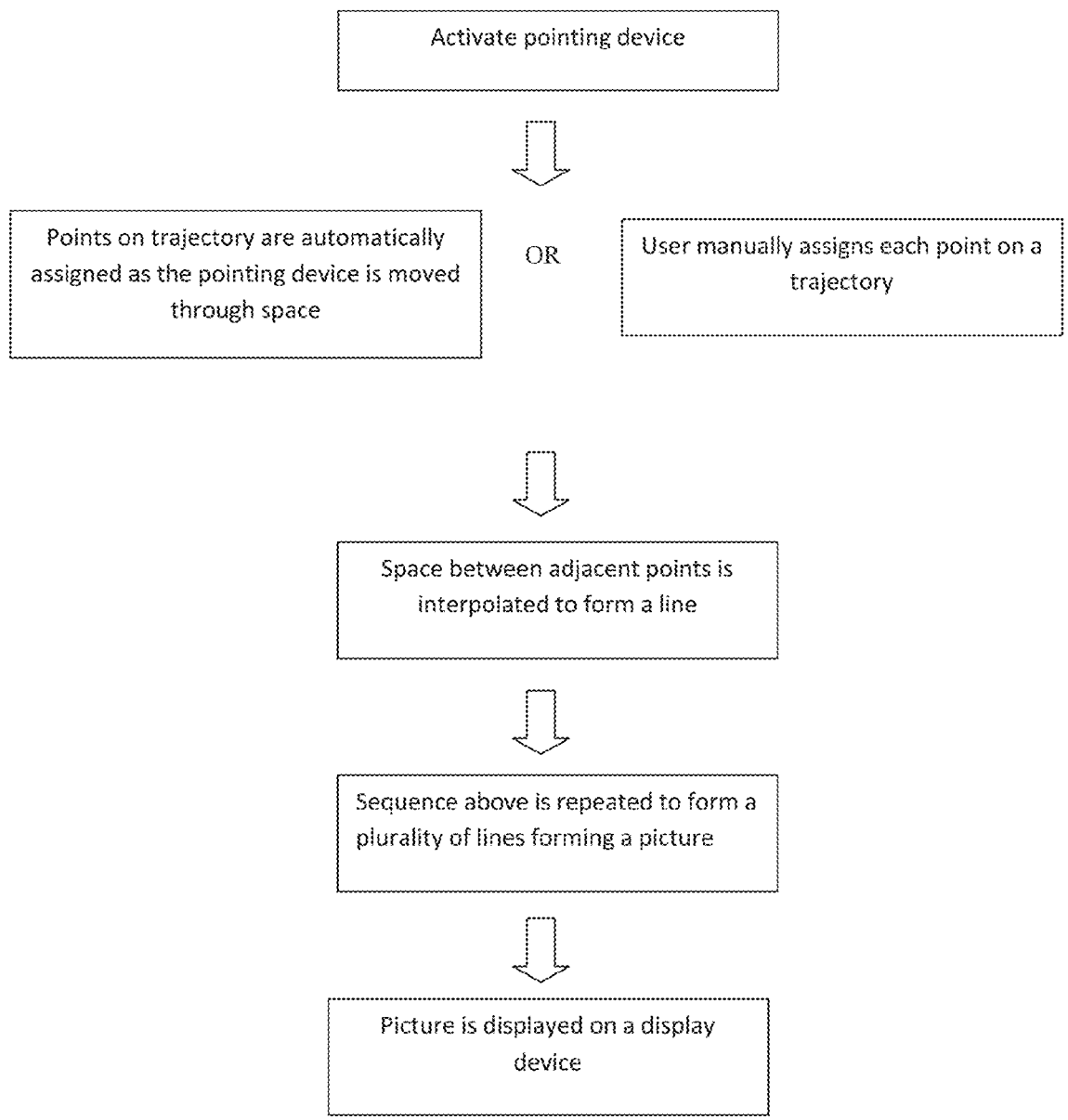
FIG. 3 is a flow/block diagram for a method of creating a picture according to aspects of the present invention.

In another aspect, the current invention includes the drawing of a plurality of trajectories according to the methods described above such that a picture is generated. In sum, drawing a plurality of trajectories where some or all of the trajectories become lines through the interpolation step described above, and the lines and trajectories comprise a picture, which may then be displayed on a display device. A non-limiting example of the steps comprising this aspect of the invention is found in FIG. 3.

In another aspect, the present invention includes a method of creating a three-dimensional image from a two-dimensional picture. The method includes the steps of obtaining a two-dimensional picture, for example, a picture drawn according to the methods described in this disclosure, applying a low-pass filter to the picture, creating a set of multi-view images from the picture by creating a plurality of copies of the picture and applying an offset factor to each multi-view image, and integrating the set of multi-view images using a two-dimensional mask function in order to create a three-dimensional image.

A variety of low-pass filters are usable within the scope of the invention, for example, a Rectangular filter or Hamming filter. The result of applying a low-pass filter to a two-dimensional picture, such as one generated according to the methods described in this disclosure, is a smoothed depth image $\hat{O}(x, y)$. The low-pass filter, denoted by $F(x, y)$ may be selected from among any available low-pass filter in order to adjust the smoothing effect to a desired profile. The filtering process can be represented by the convolution between the depth profile of a picture or portion thereof, $O(x, y)$, and the low-pass filter, $F(x, y)$, as $\hat{O}(x, y)=O(x, y)*F(x, y)$.

One non-limiting example embodiment of this method of creating a three-dimensional image from a two-dimensional picture is as follows. Let $O(x, y)$ represent the depth profile of all spaced points in a two-dimensional picture drawn using the present invention, and let each spaced point have a depth profile. A low-pass filter is applied to each spaced point, and more particularly, to the values in the depth profile for each spaced point in the picture to generate a smoothed depth image $\hat{O}(x, y)$. Next, a set M (where M is equal to, or greater than, two) of multi-view images is generated from the smoothed depth image. Let $I(x, y)$ represent a picture drawn by the method described in this disclosure, and $g_i(x, y)_{0 \leq i < M}$ denote the multi-view images to be generated. Next, an offset factor is applied to each multi-view image in order to convert $I(x, y)$ to $g_i(x, y)_{0 \leq i < M}$ including a first parameter offset and a second parameter $w_d$. This process may be defined as If (i≥offset) then $g_i(x+m,y)=I(x,y)$ for $0 \leq m \leq (i-\text{offset}) w_d \hat{O}(x,y)$, and If (i<offset) then $g_i(x+m,y)=I(x,y)$ for $(i-\text{offset}) w_d \hat{O}(x,y) \leq m \leq 0$.

where offset is a pre-defined integer value which may be in the range [0, M]. It is understood that other ranges are possible and could be manually set or adjusted by the user. In addition, different source images may have different offset values. The offset value imposes a horizontal shift on each of the multi-view images, creating a three-dimensional effect. The variable $w_d$ is a weighting factor which is constant for a given source image $I(x, y)$ and is used to adjust the differences between multi-view images.

In general, the larger the value of $w_d$, the larger will be the three-dimensional effect. It is important to note that if $w_d$ is made too large, the three-dimensional effect will be degraded or even destroyed. In some embodiments, $w_d$ may be within the range $[0, 6/V_{max}]$, where $V_{max}$ is a normalizing constant which may be the maximum luminance intensity of a pixel in the source image I(x, y). In other embodiments, the term $(i-\text{offset})w_d\hat{O}(x, y)$ may be limited to a maximum and a minimum value, as desired by a user. As with the other variables in this invention, this range may also be adjusted manually by the user.

After the multi-view images have been generated, the set of multi-view images, M, are merged into a single integrated image. The integrated image, denoted by IM(x, y), is a two dimensional image which will appear as a three dimensional image if displayed on a three dimensional display device, with each pixel recording a color defined by the red (R), green (G) and blue (B) values, represented as $IM_R(x, y)$, $IM_G(x, y)$ and $IM_B(x, y)$, respectively. Each multi-view image, denoted by $g_i(x, y)$ is a two-dimensional image, each pixel recording a color defined by the red, green and blue values, represented as $g_{i;R}(x, y)$, $g_{i;G}(x, y)$ and $g_{i;B}(x, y)$, respectively. The integration of the multi-view images $g_i(x, y)$ is achieved through the use of a two-dimensional mask function, denoted MS(x, y). Each value of MS(x, y) records a triplet of values, each in the range [0, M], and represented as $MS_R(x, y)$, $MS_G(x, y)$ and $MS_B(x, y)$. An example of how the integration of multi-view images may be accomplished is shown in the following equations $$IM_R(x,y)=g_{j;R}(x,y), \text{ where } j=MS_R(x,y)$$

$$IM_G(x,y)=g_{m;G}(x,y), \text{ where } m=MS_G(x,y)$$

$$IM_B(x,y)=g_{n;B}(x,y), \text{ where } n=MS_B(x,y)$$

Figure 4:
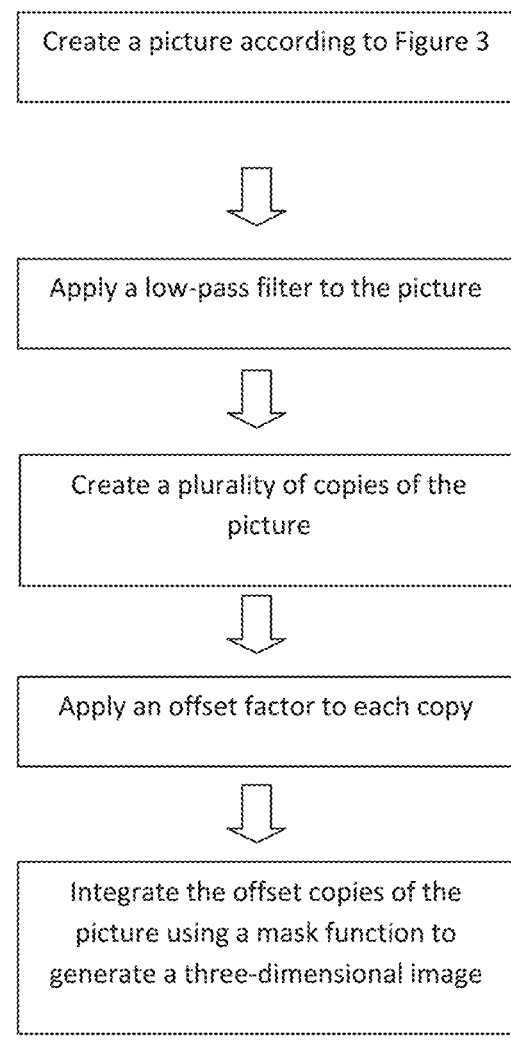
FIG. 4 is a flow/block diagram for a method of generating a three-dimensional image from a two-dimensional picture according to aspects of the present invention.

The specific mask function, MS(x, y), to be used in a particular application is dependent on the design of the autostereoscopic monitor which is used to display the integrated image. A non-limiting example of the steps comprising this aspect of the invention is found in FIG. 4.

Figure 5:
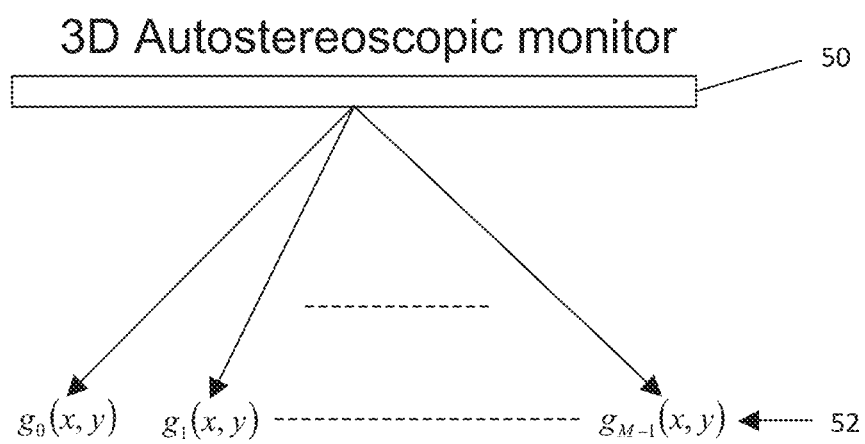
FIG. 5 depicts an autostereoscopic monitor displaying multi-view images generated according to a method of the present invention.

In another aspect, the present invention includes displaying a three-dimensional image created from a two-dimensional picture. Any type of display device that is suitable to display three-dimensional images is contemplated to be within this aspect of the invention, including stereoscopic and autostereoscopic display devices. When the multi-view images are displayed on a three-dimensional autostereoscopic monitor (50), it will generate a three dimensional perception of the source image I(x, y) as shown in FIG. 5. More specifically, as shown in FIG. 5, each image in the sequence of images $[g_0(x, y), g_1(x, y), \ldots, g_{M-1}(x, y)]$ (52) will be refracted to a unique angle.

Another aspect of this invention includes displaying the trajectories and/or pictures generated according to the present disclosure on a display device. Any display device capable of projecting an image for visual comprehension by a user is contemplated, with non-limiting examples including a standard definition television set, a high definition television set, a stereoscopic display device, an autostereoscopic display device, and a projection-based display device, among others.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "circuit," "system," or "computing unit." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
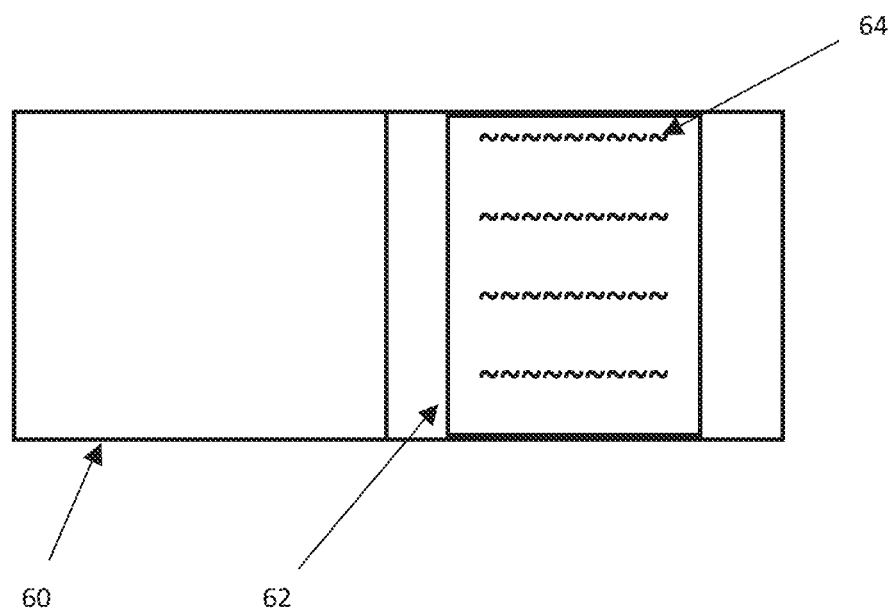
FIG. 6 is a block diagram of one example of a computer program product storing code or logic implementing a method of the present invention.

Referring now to FIG. 6, in one example, a computer program product 60 includes, for instance, one or more computer readable storage media 62 to store computer readable program code means or logic 64 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Figure 7:
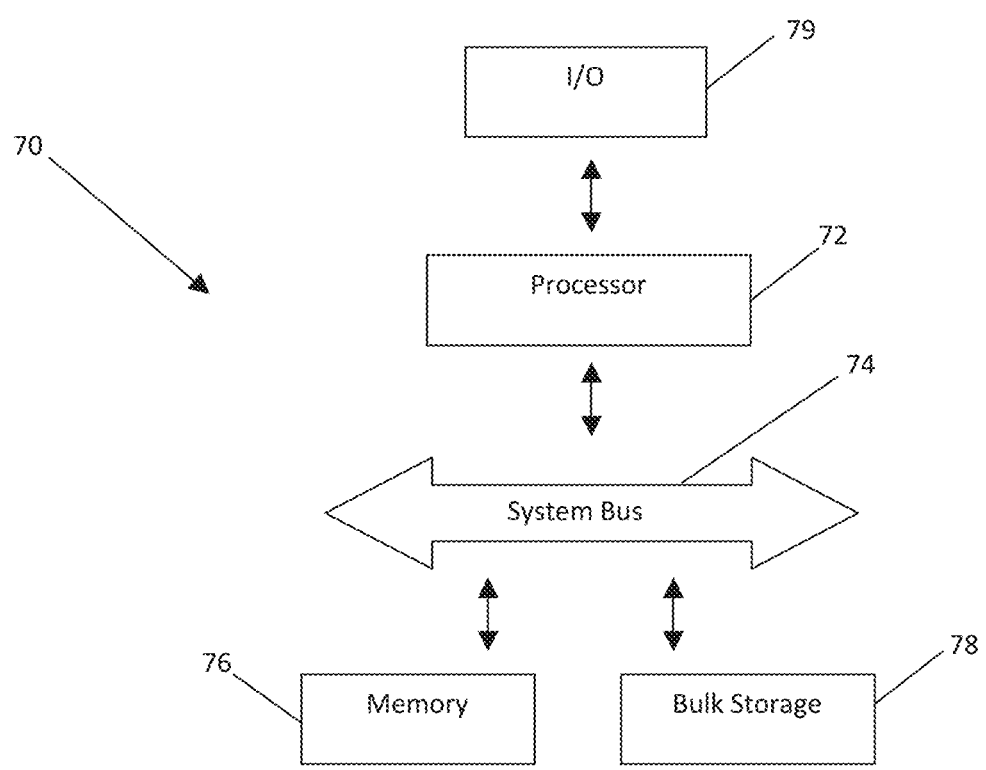
FIG. 7 is a block diagram of one example of a computing unit storing and executing program code or logic implementing a method of the present invention.

As shown in FIG. 7, one example of a computing unit 70 may be provided suitable for storing and/or executing program code is usable that includes at least one processor 72 coupled directly or indirectly to memory elements through a system bus 74. As known in the art, the memory elements include, for instance, data buffers, local memory 76 employed during actual execution of the program code, bulk storage 78, and cache memory which provide temporary storage of at least some program code in order to reduce the number of times code must be retrieved from bulk storage during execution.

Input/Output or I/O devices 79 (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of creating a three-dimensional image from a two-dimensional picture, the method comprising:
   generating a plurality of lines from a plurality of spaced points for each line, each point comprising image data, by interpolating the space between adjacent points of a given line, wherein the plurality of lines together create a two-dimensional picture;
   creating a set of multi-view images, each multi-view image comprising a left-eye image and a right-eye image, both the left-eye image and right-eye image created from the two-dimensional picture, each multi-view image being created by applying an offset factor to each point in the two-dimensional picture; and
   integrating the set of multi-view images to create a three-dimensional image capable of being displayed on a three-dimensional autostereoscopic display.

2. The method of claim 1, wherein the generating comprises:
   drawing a trajectory on a digital canvas with a pointing device, wherein the trajectory comprises the plurality of spaced points, and wherein the image data for each spaced point comprises a plurality of characteristics, comprising a geometric profile, a depth, and a color if a color trajectory or an intensity if a monochromatic trajectory; and
   adjusting at least one of the plurality of characteristics for at least one of the points by manually controlling a speed of the drawing, wherein a faster drawing speed results in spacing between two successive points of the plurality of spaced points that is greater than that resulting from a slower speed.

3. The method of claim 2, further comprising assigning one or more of the plurality of characteristics.

4. The method of claim 2, further comprising repeating the drawing, adjusting and generating to produce the plurality of lines that comprise the two-dimensional picture.

5. The method of claim 2, wherein the trajectory is displayed on a three-dimensional autostereoscopic display device.

6. The method of claim 2, wherein the trajectory is drawn by moving the pointing device through space and each point is automatically selected.

7. The method of claim 2, wherein the trajectory is drawn by assigning the points using the pointing device.

8. The method of claim 2, wherein the geometric profile of each point is assigned according a formula:

$$t(n)=t(n-1)+\Delta T \times sgn(n)$$

wherein n denotes a given point, and wherein $\Delta T$ is a constant and sgn(n) is either +1 or −1.

9. The method of claim 2, wherein the color or intensity of each point is assigned according to a formula:

$$c(n)=c(n-1)+\Delta C \times sgn(n)$$

wherein n denotes a given point, and wherein $\Delta C$ is an ordered triplet defined as $(\Delta C_R, \Delta C_G, \Delta C_B)$, $\Delta C_R$, $\Delta C_G$, and $\Delta C_B$ are constant values, $C_R$ is a color intensity value for red, $C_G$ is a color intensity value for green, and $C_B$ is a color intensity value for blue, and sgn(n) is either +1 or −1.

10. The method of claim 2, wherein the depth of each point is assigned according to a formula:

$$z(n)=[w_R C_R(n)+w_G C_G(n)+w_B C_B(n)]$$

wherein n denotes a given point, and wherein $C_R$ is a color intensity value for red, $C_G$ is a color intensity value for green, and $C_B$ is a color intensity value for blue.

11. The method of claim 2, wherein the depth of each point is assigned according to a formula:

$$z(n)=z(n-1)+\Delta Z \times sgn(n)$$

wherein n denotes a given point, and wherein $\Delta Z$ is a constant and sgn(n) is either +1 or −1.

12. The method of claim 1, further comprising:
applying a low-pass filter to the two-dimensional picture; and
wherein the integrating comprises using a two-dimensional mask function in order to create the three-dimensional image.

13. The method of claim 12, wherein said three dimensional image is displayed on a three-dimensional autostereoscopic display device.

14. The method of claim 1, wherein the creating comprises:
applying a low-pass filter to depth profile values for each of the plurality of spaced points, the applying resulting in a smoothed depth profile;
generating a set of multi-view images from the smoothed depth profile; and
applying the offset factor to each point in each multi-view image.

15. The method of claim 1, wherein the offset factor comprises: a predetermined integer value between zero and a number of multi-view images in the set, the predetermined integer value imposing a horizontal shift; and a weighting factor.

16. The method of claim 15, wherein the weighting factor is in a range between zero and 6/Vmax, and wherein Vmax is a maximum luminance intensity of the plurality of spaced points in the two-dimensional picture.

17. A system, comprising:
a central processing unit;
a memory in communication with said central processing unit; and
a pointing device in communication with said central processing unit for implementing a method of creating a three-dimensional image from a two-dimensional picture, the method comprising:
generating a plurality of lines from a plurality of spaced points for each line, each point comprising image data, by interpolating the space between adjacent points of a given line, wherein the plurality of lines together create a two-dimensional picture;
creating a set of multi-view images, each multi-view image comprising a left-eye image and a right-eye image, both the left-eye image and right-eye image created from the two-dimensional picture, each multi-view image being created by applying an offset factor to each point in the two-dimensional picture; and
integrating the set of multi-view images to create a three-dimensional image capable of being displayed on a three-dimensional autostereoscopic display.

18. The system of claim 17, wherein the generating comprises:
drawing a trajectory on a digital canvas with a pointing device, wherein the trajectory comprises the plurality of spaced points, and wherein the image data for each spaced point comprises a plurality of characteristics, comprising a geometric profile, a depth, and a color if a color trajectory or an intensity if a monochromatic trajectory; and
adjusting at least one of the plurality of characteristics for at least one of the points by manually controlling a speed of the drawing, wherein a faster drawing speed results in spacing between two successive points of the plurality of spaced points that is greater than that resulting from a slower speed.

19. The system of claim 18, wherein the method further comprises selecting one or more of the plurality of characteristics.

20. The system of claim 18, wherein the method further comprises repeating the drawing, adjusting and generating to produce the plurality of lines that comprise the two-dimensional picture.

21. The system of claim 18, wherein the trajectory is displayed on a three-dimensional autostereoscopic display device.

22. The system of claim 18, wherein the trajectory is drawn by moving the pointing device through space and each point is automatically selected.

23. The system of claim 18, wherein the trajectory is drawn by assigning the points using the pointing device.

24. The system of claim 18, wherein the geometric profile of each point is assigned according to a formula:

$$t(n)=t(n-1)+\Delta T \times sgn(n)$$

wherein n denotes a given point, and wherein $\Delta T$ is a constant and sgn(n) is either +1 or −1.

25. The system of claim 18, wherein the color or intensity of each point is assigned according to a formula:

$$c(n)=c(n-1)+\Delta C \times sgn(n)$$

wherein n denotes a given point, and wherein $\Delta C$ is an ordered triplet defined as $(\Delta C_R, \Delta C_G, \Delta C_B)$, $\Delta C_R$, $\Delta C_G$, and $\Delta C_B$ are constant values, $C_R$ is a color intensity value for red, $C_G$ is a color intensity value for green, and $C_B$ is a color intensity value for blue, and sgn(n) is either +1 or −1.

26. The system of claim 18, wherein the depth of each point is assigned according to a formula:

$$z(n)=[w_R C_R(n)+w_G C_G(n)+w_B C_B(n)]$$

wherein n denotes a given point, and wherein $C_R$ is a color intensity value for red, $C_G$ is a color intensity value for green, and $C_B$ is a color intensity value for blue.

27. The system of claim 18, wherein the depth of each point is assigned according to a formula:

$$z(n)=z(n-1)+\Delta Z \times sgn(n)$$

wherein n denotes a given point, and wherein $\Delta Z$ is a constant and sgn(n) is either +1 or −1.

28. The system of claim 17, wherein the method further comprises:
applying a low-pass filter to the two-dimensional picture; and
wherein the integrating comprises using a two dimensional mask function in order to create the three-dimensional image.

29. The system of claim 28, wherein said three dimensional image is displayed on a three-dimensional autostereoscopic display device.

30. The system of claim 17, wherein the creating comprises:
applying a low-pass filter to depth profile values for each of the plurality of spaced points, the applying resulting in a smoothed depth profile;
generating a set of multi-view images from the smoothed depth profile; and
applying the offset factor to each point in each multi-view image.

31. The system of claim 17, wherein the offset factor comprises: a predetermined integer value between zero and a number of multi-view images in the set, the predetermined integer value imposing a horizontal shift; and a weighting factor.

32. The system of claim 31, wherein the weighting factor is in a range between zero and 6/Vmax, and wherein Vmax is a maximum luminance intensity of the plurality of spaced points in the two-dimensional picture.

33. A computer program product for creating a three-dimensional image from a two-dimensional picture, the computer program product comprising a storage medium readable by a processing circuit and storing instructions for execution by the processing circuit for performing the method, the method comprising:
generating a plurality of lines from a plurality of spaced points for each line, each point comprising image data, by interpolating the space between adjacent points of a given line, wherein the plurality of lines together create a two-dimensional picture;
creating a set of multi-view images, each multi-view image comprising a left-eye image and a right-eye image, both the left-eye image and right-eye image created from the two-dimensional picture, each multi-view image being created by applying an offset factor to each point in the two-dimensional picture; and
integrating the set of multi-view images to create a three-dimensional image capable of being displayed on a three-dimensional autostereoscopic display.

34. The computer program product of claim 33, wherein the generating comprises:
drawing the trajectory on a digital canvas with a pointing device, wherein the trajectory comprises a plurality of spaced points, and wherein the image data for each spaced point comprises a plurality of characteristics, comprising a geometric profile, a depth, and a color if a color trajectory or an intensity if a monochromatic trajectory; and
adjusting at least one of the plurality of characteristics for at least one of the points by manually controlling a speed of the drawing, wherein a faster drawing speed results in spacing between two successive points of the plurality of spaced points that is greater than that resulting from a slower speed.

35. The computer program product of claim 34, wherein the method further comprises selecting one or more of the plurality of characteristics.

36. The computer program product of claim 34, wherein the method further comprises repeating the drawing, adjusting and generating to produce the plurality of lines that comprise the two-dimensional picture.

37. The computer program product of claim 34, wherein the trajectory is displayed on a three-dimensional autostereoscopic display device.

38. The computer program product of claim 34, wherein the trajectory is drawn by moving the pointing device through space and each point is automatically selected.

39. The computer program product of claim 34, wherein the trajectory is drawn by assigning the points using the pointing device.

40. The computer program product of claim 34, wherein the geometric profile of each point is assigned according to a formula:

$$t(n)=t(n-1)+\Delta T \times sgn(n)$$

wherein n denotes a given point, and wherein $\Delta T$ is a constant and sgn(n) is either +1 or −1.

41. The computer program product of claim 34, wherein the color or intensity of each point is assigned according to a formula:

$$c(n)=c(n-1)+\Delta C \times sgn(n)$$

wherein n denotes a given point, and wherein $\Delta C$ is an ordered triplet defined as $(\Delta C_R, \Delta C_G, \Delta C_B)$, $\Delta C_R$, $\Delta C_G$, and $\Delta C_B$ are constant values, $C_R$ is a color intensity value for red, $C_G$ is a color intensity value for green, and $C_B$ is a color intensity value for blue, and sgn(n) is either +1 or −1.

42. The computer program product of claim 34, wherein the depth of each point is assigned according to a formula:

$$z(n)=[w_R C_R(n)+w_G C_G(n)+w_B C_B(n)]$$

wherein n denotes a given point, and wherein $C_R$ is a color intensity value for red, $C_G$ is a color intensity value for green, and $C_B$ is a color intensity value for blue.

43. The computer program product of claim 34, wherein the depth of each point is assigned according to a formula:

$$z(n)=z(n-1)+\Delta Z \times sgn(n)$$

wherein n denotes a given point, and wherein AZ is a constant and sgn(n) is either +1 or −1.

44. The computer program product of claim 33, wherein the method further comprises:
applying a low-pass filter to the two-dimensional picture; and
wherein the integrating comprises using a two dimensional mask function in order to create the three-dimensional image.

45. The computer program product of claim 44, wherein said three dimensional image is displayed on a three-dimensional autostereoscopic display device.

46. The computer program product of claim 33, wherein the creating comprises:
- applying a low-pass filter to depth profile values for each of the plurality of spaced points, the applying resulting in a smoothed depth profile;
- generating a set of multi-view images from the smoothed depth profile; and
- applying the offset factor to each point in each multi-view image.

47. The computer program product of claim 33, wherein the offset factor comprises: a predetermined integer value between zero and a number of multi-view images in the set, the predetermined integer value imposing a horizontal shift; and a weighting factor.

48. The computer program product of claim 47, wherein the weighting factor is in a range between zero and 6/Vmax, and wherein Vmax is a maximum luminance intensity of the plurality of spaced points in the two-dimensional picture.

* * * * *